United States Patent [19]

Cooper

[11] Patent Number: 5,378,014
[45] Date of Patent: Jan. 3, 1995

[54] DUAL DOOR ARRANGEMENT FOR AIR BAG DEPLOYMENT

[75] Inventor: Robert Cooper, Oshawa, Canada

[73] Assignee: Davidson Textron Inc., Dover, N.H.

[21] Appl. No.: 159,957

[22] Filed: Dec. 1, 1993

Related U.S. Application Data

[63] Continuation of Ser. No. 975,724, Nov. 13, 1992, abandoned.

[51] Int. Cl.⁶ ............................................. B60R 21/22
[52] U.S. Cl. ................................. 280/728 B; 280/732
[58] Field of Search ........... 280/728 B, 728 R, 730 R, 280/732, 752; 180/90; 296/70

[56] References Cited

U.S. PATENT DOCUMENTS

| | | | |
|---|---|---|---|
| 3,887,214 | 6/1975 | Brawn | 280/730 |
| 3,904,222 | 9/1975 | Bursott et al. | 280/732 |
| 4,327,937 | 5/1982 | Scholz et al. | 280/728 B |
| 4,842,299 | 6/1989 | Okamura et al. | 280/728 B |
| 4,895,389 | 1/1990 | Pack, Jr. | 280/728 B |
| 4,968,057 | 11/1990 | Rafferty | 280/731 |
| 4,989,896 | 2/1991 | DiSalvo et al. | 280/728 B |
| 5,082,310 | 1/1991 | Bauer | 280/732 |
| 5,215,330 | 6/1993 | Kurita | 280/728 B |

FOREIGN PATENT DOCUMENTS

| | | | |
|---|---|---|---|
| 235738 | 10/1991 | Japan | 280/728 B |
| 3-258634 | 11/1991 | Japan | 280/728 B |
| 169356 | 6/1992 | Japan | 280/728 A |

*Primary Examiner*—Karin L. Tyson
*Attorney, Agent, or Firm*—Reising, Ethington, Barnard, Perry & Milton

[57] ABSTRACT

A dual door arrangement is insert molded in a decorative automotive instrument panel to create an opening for air bag deployment. The arrangement comprises two self hinging sheet metal doors that are attached to a thermoplastic frame by integral clips. One door has an outwardly projecting lip embedded in the instrument panel that initiate a central slit in the instrument panel for propagating the air bag opening. The other door has a depressed shelf that underlies the lip and adjacent margin of the first door to provide several advantages including helping the lip to initiate the central slit.

24 Claims, 2 Drawing Sheets

DUAL DOOR ARRANGEMENT FOR AIR BAG DEPLOYMENT

This application is a continuation, division, of application Ser. No. 07/975,724, file Nov. 13, 1992 now abandoned.

BACKGROUND OF THE INVENTION

This invention relates to air bag closures and more particularly to dual door arrangements that are pushed open by the inflating air bag to create an opening for deployment of the air bag into the passenger compartment of a vehicle.

Such a dual door arrangement is generally disclosed in U.S. Pat. No. 4,968,057 granted Nov. 6, 1990 to Scott Rafferty for a cover assembly for an air bag unit. The cover assembly disclosed in this patent has two separate and distinct door members that form an open styling line when the door members are in the closed position as shown by solid lines in the patent drawings. The door members are mounted in the closed position by flanges of their respective sheet metal plates that are riveted to a rectangular frame. The flanges form bends that act as hinges for swinging the door member to an open position when the air bag inflates and pushes against the door members. The door members include separate decorative panels comprising elastomer cores and outer shells that are carried by their respective sheet metal plates. The metal plates, with their attached decorative panels, are separate and distinct in what may be termed a "visible" door arrangement. Because of the separate nature of the door members, the Rafferty cover assembly includes a substrate that is bonded to the back of the metal plates 44 to prevent separation of their adjacent ends and undesirable widening of the open styling line between the door members.

U.S. Pat. No. 4,082,310 granted Jan. 21, 1992 to David J. Bauer for an arrangement for providing an air bag deployment opening also discloses the use of sheet metal doors that include integral bendable hinge sections as shown in FIG. 9 of the patent drawing. The adjacent ends of the doors, however, are joined by a frangible hat shaped bridging and the joined doors are covered by a common decorative panel comprising a foam plastic layer and a skin layer. The doors are further joined by a stiffener that is bonded to the back of the doors. This is an "invisible" door arrangement that requires slitting and tearing the decorative panel to create an opening for air bag deployment. Such an opening is created in the arrangement by the air bag impacting against the back of the doors to split the stiffener, bridging section and decorative panel apart and then propagate an opening in the decorative panel as the doors are pushed to an open position by the air bag.

SUMMARY OF THE INVENTION

The object of this invention is to provide an improved dual door arrangement for providing an opening in a decorative panel for deployment of an air bag.

A feature of the invention is that the improved dual door arrangement has sheet metal doors that are self stabilized in the closed position so that there is no need to bond a common substrate to the back of the doors as in the case of the visible door arrangement of the Rafferty patent or to join the doors together in a common metal stamping as in the case of the invisible door arrangement of the Bauer patent.

Another feature of the invention is that the improved dual door arrangement has separate doors that are configured to concentrate the initial load of the air bag to facilitate initiation of a central slit in a decorative panel for creating an opening in the decorative panel for deployment of the air bag into a passenger compartment.

Still another feature of the invention is that the improved dual door arrangement has separate metal doors with adjacent margins that overlap to facilitate insert molding the arrangement as part of a decorative panel to provide an invisible door arrangement in the decorative panel.

Still another feature of the invention is that the improved dual door arrangement has separate metal doors with overlapping margins that are shaped to concentrate the initial load of the inflating air bag to improve initiation of a central slit in a decorative panel for propagating an opening in the decorative panel for deployment of the air bag into the passenger compartment.

Yet another feature of the invention is that the improved dual door arrangement has conformations for reducing cracking of a decorative panel shell at low temperatures when the improved dual door arrangement is insert molded as part of the decorative panel.

Still yet another feature of the invention is that the improved dual door arrangement has self hinging sheet metal doors that are attached to a rectangular frame without need of rivets, adhesives or other external fasteners.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
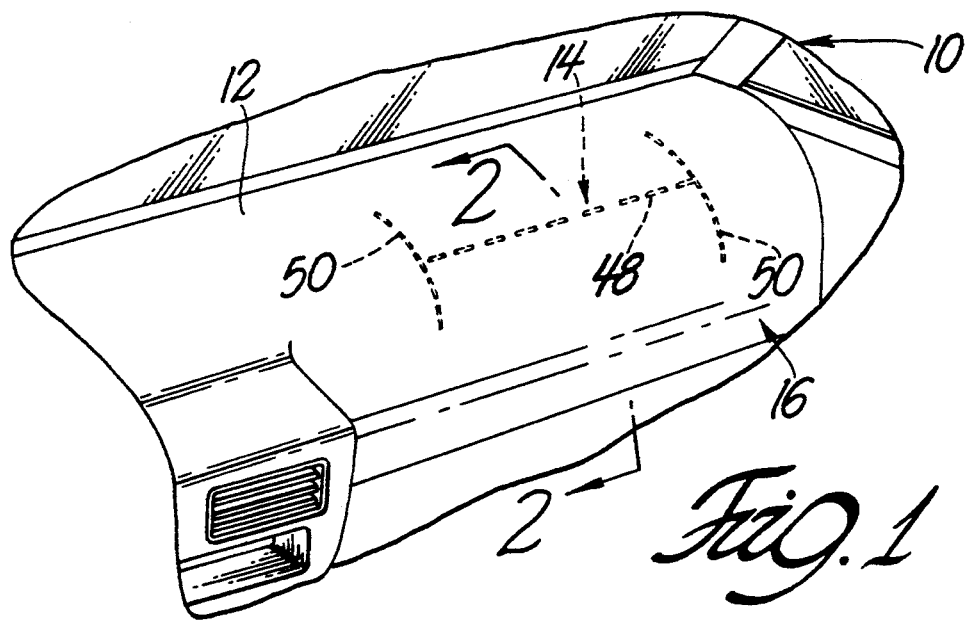
FIG. 1 is a fragmentary perspective view of an automotive passenger compartment having an instrument panel that is equipped with a passenger side air bag and a dual door arrangement of this invention for generating an opening in the instrument panel for the deployment of the air bag.

Referring now to the drawing, an automotive passenger compartment 10 has an instrument panel 16 that forms part of the decorative interior trim panels of the automobile. Passenger compartments, particularly front seat passenger compartments, now often include driver side and passenger side air bags that are deployed to protect the driver and passenger in the event of a collision.

The air bags are typically housed in a receptacle or canister that is mounted behind a steering wheel pad for the driver or behind the instrument panel for the passenger. In either event, the air bag is located behind a decorative panel that must be provided with an opening for deployment of the airbag in some fashion when the air bag is deployed.

The dual door arrangement of this invention provides such an opening in a decorative panel for deployment of the air bag responsive to inflation of the air bag.

The patent drawings illustrate an invisible application of a dual door arrangement 14 of this invention for providing an opening in the instrument panel 16 for the deployment of a passenger side air bag that is housed in a schematically represented canister 17 that is behind the instrument panel 16. However, the invention is also applicable to a driver side air bag that is housed in a steering wheel pad and to visible applications.

The dual door arrangement 14 that is shown covered by the decorative instrument panel 16 in FIG. 1, comprises a curved support or insert 18 that is molded of relatively rigid thermoplastic material and secured in the passenger compartment behind the instrument panel 12 and in front of the canister 17 containing a deflated air bag. The support has an integral, generally rectangular frame 20. The frame 20 projects inwardly of the support 18 toward the canister 17 and defines a generally rectangular opening for deployment of the air bag when it is inflated.

The dual door arrangement 14 further comprises two similar sheet metal doors 22 and 24 that close the opening outlined by the frame 20 and that cooperate to create an opening through the instrument panel 12 when the air bag is deployed. The doors are economically made of one-piece construction and are preferably made of aluminum which is light and easy to form.

The metal door 22 has a curved closure portion 26 that matches the contour of the curved support 18 and an inward flange 28 that creates a bend 30 at one edge of the closure portion 26. The free end of the flange 28 is bent back toward the panel portion 26 to provide an integral, resilient U-shaped clip 32 that grips a side wall of the frame 20 to secure the door 22 in place. Once the door 22 is secured, the bend 30 acts as a hinge for swinging the closure portion 26 from a closed position behind the decorative panel 16 to an open position extending through the decorative panel 16 when the closure portion is pushed by the inflating air bag housed in the canister 17. The closed position is shown in solid lines in FIG. 2 while the open position is shown in phantom lines.

Figure 3:
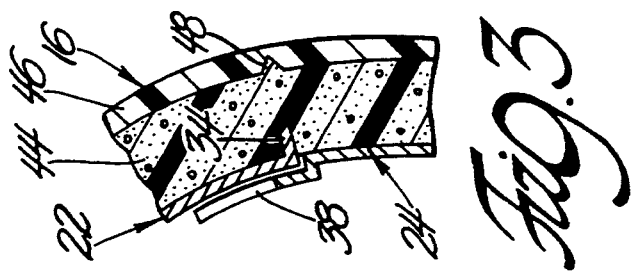
FIG. 3 is an enlargement of a portion of FIG. 2.

The metal door 22 also has a short outwardly projecting flange or lip 34 at the opposite edge of the closure portion 26 that extends for the full width of the closure portion 26 and stiffens the closure portion 26 in the lateral direction. The lip 34, which preferably has a chisel shaped tip as shown in FIG. 3, is used to initiate a central slit in the decorative panel 16 for generating an opening in the decorative panel 16 for deployment of the air bag into the passenger compartment as the closure portion 26 is pushed from the closed position to the open position by the inflating air bag.

Figure 2:
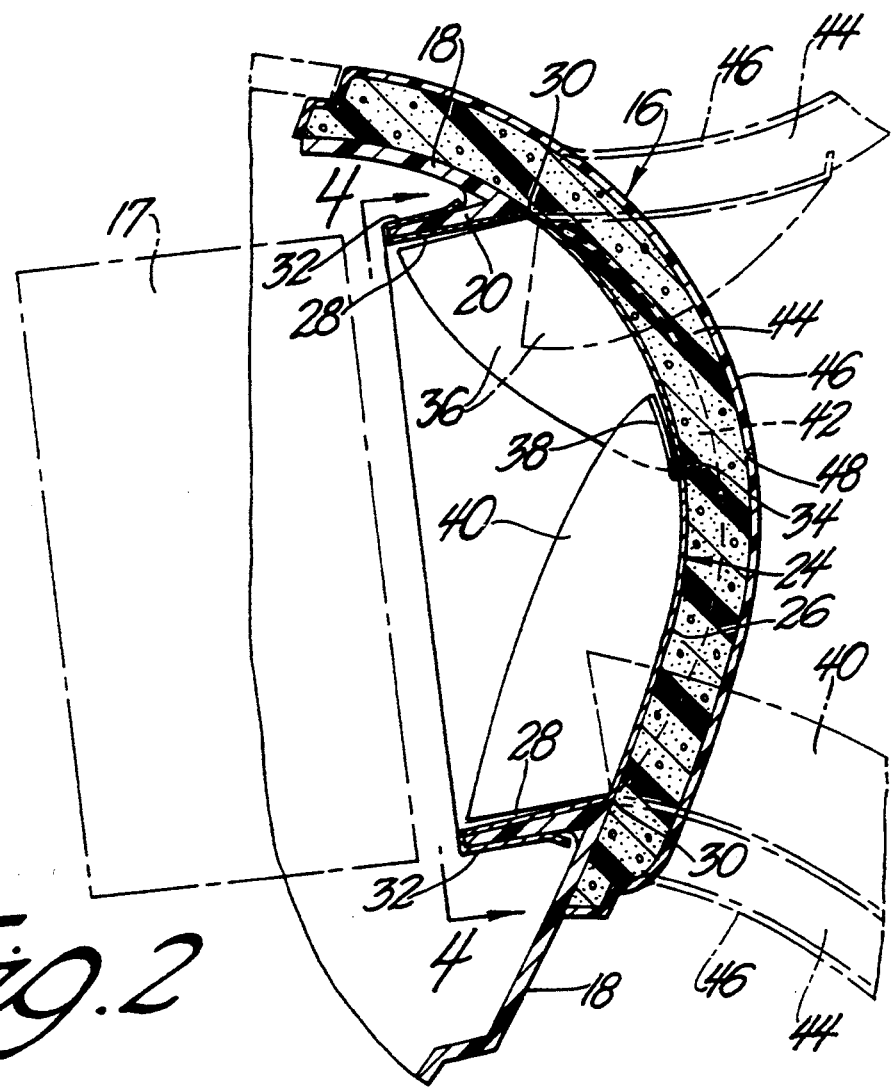
FIG. 2 is a section taken substantially along the line 2—2 of FIG. 1 looking in the direction of the arrows showing the dual door arrangement of this invention installed in an instrument panel.

The metal door 22 also has integral, perpendicular side wings 36 at the side edges of the closure portion 26 that stiffen the closure portion 26 in the vertical direction and protect the air bag during deployment. The side wings 36 have generally horizontal edges that are next to the frame 20 as best shown in FIG. 2. These edges bottom out on the frame 20 to support the door 22 in the closed position shown in solid line in FIG. 2 so that the door 22 cannot be pushed in accidentally.

As indicated above, the metal door 24 is similar and consequently corresponding portions are identified with the same numerals.

Thus the metal door 24 also has a curved closure portion 26 that matches the contour of the curved support 18 and an inward flange 28 that creates a bend 30 at one edge of the closure portion 26. The free end of the flange 28 is bent back toward the panel portion 26 to provide an integral, resilient U-shaped clip 32 that grips an opposite side wall of the frame 20 to secure the door 24 in place. The bend 30 then acts as a hinge for swinging the closure portion 26 of the door 24 from a closed position behind the decorative panel 16 to an open position extending through the decorative panel 16 when the closure portion 26 is pushed by the inflating air bag housed in the canister 17. Again the closed position is shown in solid lines in FIG. 2 while the open position is shown in phantom lines.

The metal door 24 is unique in that it has a depressed flange or shelf 38 at the end margin of its closure portion 26 that extends for the width of the closure portion 26. The depressed shelf 38 underlies the outwardly projecting flange 34 and end margin of the closure portion 26 of door 22 when the doors 22 and 24 are in the closed position as shown in solid lines in FIG. 2. The depressed shelf 38 provides many advantages. First of all, it helps the outwardly projecting lip 34 of the other metal door to slit and tear the decorative panel 16 during the initial stages as both doors are simultaneously pushed out by the inflating air bag to create an opening in the decorative panel 16 for deployment of the air bag. Secondly, the depressed shelf 38 stiffens the closure portion 26 of the door 24 in the lateral direction. The depressed shelf 38 also provides a stop for other door 22 so that the closed position of the doors 22 and 24 is determined easily and the doors 22 and 24 do not cave in easily. Furthermore, the depressed shelf 38 provides a shield and a labyrinth seal at the interface of the doors 22 and 24 that prevents penetration of foreign objects and materials at the door interface. This is particularly important during the manufacturing process if the dual door assembly is insert molded in the decorative panel 16.

Moreover the edge of the depressed shelf sweeps upwardly at the shelf ends as shown in FIG. 3. The advantage of this feature is that initiation of the tear seam at the center of the door is assured.

Figure 4:
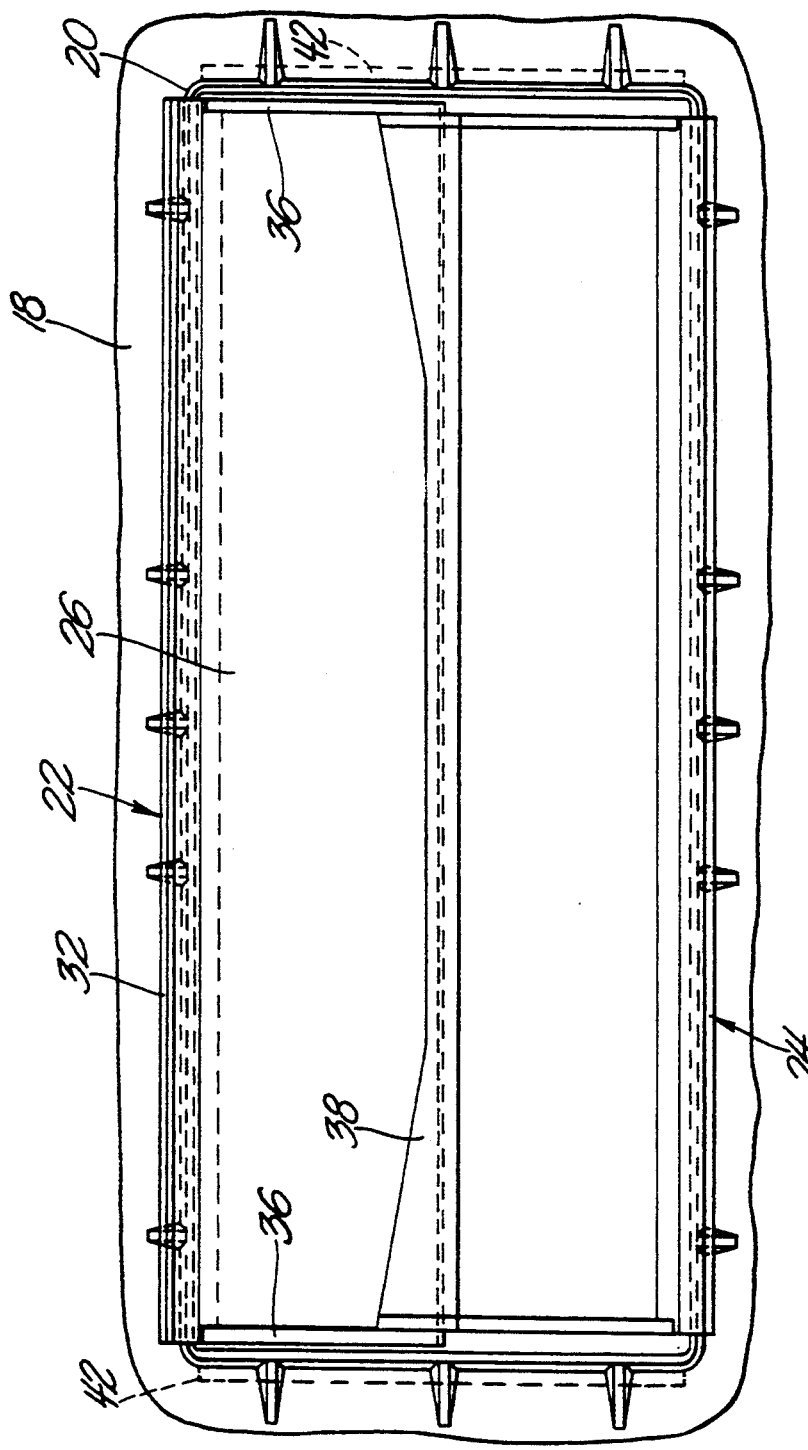
FIG. 4 is a rear view of the dual door arrangement shown in FIGS. 1, 2 and 3 taken substantially along the line 4—4 of FIG. 2 looking in the direction of the arrows.

The metal door 24 also has integral, perpendicular side wings 40 at the side edges of its closure portion 26 that stiffen its closure portion 26 in the vertical direction and protect the air bag during deployment. The side wings 40, however, are also attached to the side edges of the depressed shelf 38. Consequently the side wings 40 are juxtaposed the inside surfaces of the side wings 36 of the door 22, as shown in FIG. 4 so that the integral side wings 36 and 40 both extend for the full height of their respective metal doors 22 and 24 as shown in FIGS. 2 and 4. The side wings 40 also have generally horizontal edges that are next to the frame 20 as best shown in FIG. 2. These edges bottom out on the frame 20 to support the door 24 and prevent the door 24 from being pushed inwardly of the closed position shown in solid line in FIG. 2.

The support 18 may also include stabilizing ribs 42 adjacent the short sides of the rectangular frame 20. These stabilizing ribs 42 which project forwardly and embed in the decorative panel 16 as shown in FIG. 2 reduce cracking of the outer shell or skin when the dual door arrangement 14 is insert molded as part of the decorative instrument panel 16.

The decorative instrument panel 16 comprises a foam plastic layer 44 that is covered by a vinyl skin 46 and the dual door assembly 14 is preferably insert molded as part of the decorative instrument panel 16 so that the face of the support 18 adheres to the foam plastic layer 44 and the optional stabilizing ribs 42 embed in the foam plastic layer 44. The under surface of the vinyl skin 46 is scored or notched in some fashion in a H-pattern as shown in FIGS. 1 and 3 to provide a central tear line 48 and side tear lines 50. The central tear line 50 promotes a central slit for initiating an air bag deployment opening through the decorative panel 16 that is propagated by tearing the slit decorative panel along the side tear lines 50 as explained below.

The dual door arrangement 14 operates as follows. When the air bag in the canister 17 inflates, it pushes against the sheet metal doors 22 and 24 the initial load of the inflating air bag is concentrated at the tip of the lip 34 because the load on door 24 is also transferred to the lip 34 by the depressed shelf 38. Consequently the lip 34 breaks through the foam plastic layer 44 and vinyl skin 46 in a very quick and efficient manner to create a central slit at the tear line 48. The doors 22 and 24 then continue to swing open and propagate an air bag deployment opening by tearing the decorative panel 16 along the side tear lines 50 that are aligned with the short sides of the frame 20. This propagates flap portions of decorative panel 16 that are continuously folded open thus creating the air bag deployment opening as the metal door 22 and 24 swing to the fully open position shown in phantom in FIG. 2.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A dual door arrangement for providing an opening in a decorative panel for the deployment of an air bag that is covered by the decorative panel comprising;
   a frame that is adapted for securement between a deflated air bag and a decorative panel covering the deflated air bag and that defines a generally rectangular opening for deployment of the air bag,
   the frame having spaced sides opposite each other that project inwardly toward the deflated air bag,
   a first metal door of one piece construction having a closure portion, a portion for attaching the first metal door to one side of the frame, and a portion that acts as a hinge for swinging the closure portion from a closed position behind the decorative panel to an open position extending through the decorative panel,
   a second metal door of one piece construction having a closure portion, a portion for attaching the second metal door to an opposite side of the frame, and a portion that acts as a hinge for swinging the closure portion of the second metal door from a closed position behind the decorative panel to an open position extending through the decorative panel,
   the second metal door having a depressed shelf at an end margin of its closure portion that is remote from the opposite side of the frame, the depressed shelf underlying an end margin of the closure portion of the first metal door that is remote from the one side of the frame for stabilizing the metal doors in the closed position.

2. The dual door arrangement as defined in claim 1 wherein:
   the first metal door has a outwardly projecting lip at an edge of its closure portion that is remote from the one side of the frame for initiating a central slit in the decorative panel for propagating an opening in the decorative panel for deployment of the air bag as its closure portion swings from the closed position to the open position responsive to inflation of the air bag, and
   the depressed shelf underlying the end margin of the closure portion of the first metal door helps the outwardly projecting lip in initiating the central slit.

3. The dual door arrangement as defined in claim 2 wherein:
   the outwardly projecting lip extends for the full width of the closure portion of the first metal door to stiffen it in a lateral direction,
   the first metal door has integral side wings for stiffening the closure portion of the first metal door in a vertical direction,
   the depressed shelf extends for the full width of the closure portion of the second metal door to stiffen it in the lateral direction, and
   the second metal door has integral side wings for stiffening the closure portion of the lower metal door in the vertical direction.

4. The dual door arrangement as defined in claim 3 wherein the integral side wings of the second metal door are juxtaposed inside surfaces of the integral side wings of the first metal door so that the integral side wings extend for the full height of the closure portions of the first and second metal doors.

5. The dual door arrangement as defined in claim 2 wherein the frame has ribs at each short side of the rectangular opening that project outwardly for embedment in a decorative panel to reduce cracking of the skin of the decorative panel at low temperatures.

6. A dual door arrangement for generating an opening in a decorative panel for the deployment of an air bag that is covered by the decorative panel comprising;
   a support that is adapted for securement between a deflated air bag and a decorative panel covering the deflated air bag and that has a generally rectangular frame,
   the frame projecting inwardly toward the deflated air bag and defining an opening for deployment of the air bag,
   a first metal door of one piece construction having a closure portion and an inward flange that creates a bend at one edge of the closure portion that acts as a hinge for swinging the closure portion from a closed position behind the decorative panel to an open position extending through the decorative panel, the inward flange being attached to one side of the rectangular frame,
   the first metal door having a outwardly projecting lip at an opposite edge of its closure portion that is remote from the one side of the frame for initiating a central slit in the decorative panel for spreading the decorative panel apart to generate an opening in the decorative panel for deployment of the air bag as its closure portion swings from the closed position to the open position responsive to inflation of the air bag, a second metal door of one piece construction having a closure portion and an inward flange that creates a bend at one edge of the closure portion that acts as a hinge for swinging the closure portion from a closed position behind the decorative panel to an open position extending through the decorative panel, the inward flange being attached to an opposite side of the rectangular frame, the second metal door having a depressed shelf at an end margin of its closure portion that is remote from the opposite side of the rectangular frame, the depressed shelf underlying an end margin of the closure portion of the first metal door that has the outward lip for assisting the lip in initiating the central slit for spreading the decorative panel apart during the initial stages of generating the opening in the decorative panel.

7. The dual door arrangement as defined in claim 6 wherein the outwardly projecting lip and the depressed shelf extend for the full width of their respective closure portions to strengthen them in a lateral direction.

8. The dual door arrangement as defined in claim 6 wherein:
the first metal door has integral side wings for stiffening the closure portion of the first metal door in a vertical direction, and
the second metal door has integral side wings for stiffening the closure portion of the second metal door in the vertical direction.

9. The dual door arrangement as defined in claim 7 wherein:
the first metal door has integral side wings for stiffening the closure portion of the first metal door in a vertical direction,
the second metal door has integral side wings for stiffening the closure portion of the second metal door in the vertical direction, and
the integral side wings of the second metal door are juxtaposed inside surfaces of the integral side wings of the first metal door so that the integral side wings extend for the full height of the closure portions of the first and second metal doors.

10. The dual door arrangement as defined in claim 6 wherein the support has ribs adjacent the short sides of the rectangular frame that extend outwardly for embedment in the decorative panel.

11. A dual door arrangement for generating an opening in a decorative panel for the deployment of an air bag that is covered by the decorative panel comprising;
a support that is adapted for securement between a deflated air bag and a decorative panel covering the deflated air bag and that has a generally rectangular frame,
a first metal door that is attached to one side of the frame so that a closure portion swings from a closed position behind the decorative panel to an open position extending through the decorative panel,
the first metal door having a outwardly projecting lip at an edge of its closure portion that is remote from the one side of the frame for initiating a central slit in the decorative panel for spreading the decorative panel apart to generate an opening in the decorative panel for deployment of the air bag as its closure portion swings from the closed position to the open position responsive to inflation of the air bag,
a second metal door that is attached to an opposite side of the frame so that a closure portion swings from a closed position behind the decorative panel to an open position extending through the decorative panel,
the second metal door having a depressed shelf at an end margin of its closure portion that is remote from the opposite side of the rectangular frame, the depressed shelf underlying an end margin of the closure portion of the first metal door that has the outward lip for assisting the lip in initiating the central slit for spreading the decorative panel apart during the initial stages of generating the opening in the decorative panel.

12. The dual door arrangement as defined in claim 11 wherein the outwardly projecting lip and the depressed shelf extend for the full width of their respective closure portions to strengthen them in a lateral direction.

13. The dual door arrangement as defined in claim 11 wherein:
the first metal door has integral side wings for stiffening the closure portion of the first metal door in a vertical direction, and
the second metal door has integral side wings for stiffening the closure portion of the second metal door in the vertical direction.

14. A dual door arrangement for generating an opening in a decorative panel for the deployment of an air bag that is covered by the decorative panel comprising;
a support that is adapted for securement between a deflated air bag and a decorative panel covering the deflated air bag and that has a generally rectangular frame,
a first metal door that is attached to one side of the frame so that a closure portion swings from a closed position behind the decorative panel to an open position extending through the decorative panel,
the first metal door having a outwardly projecting lip at an edge of its closure portion that is remote from the one side of the frame for initiating a central slit in the decorative panel for spreading the decorative panel apart to generate an opening in the decorative panel for deployment of the air bag as its closure portion swings from the closed position to the open position responsive to inflation of the air bag,
a second metal door that is attached to an opposite side of the frame so that a closure portion swings from a closed position behind the decorative panel to an open position extending through the decorative panel,
the second metal door having a depressed shelf at an end margin of its closure portion that is remote from the opposite side of the rectangular frame, the depressed shelf underlying an end margin of the closure portion of the first metal door that has the outward lip for assisting the lip in initiating the central slit for spreading the decorative panel apart during the initial stages of generating the opening in the decorative panel, the outwardly projecting lid and the depressed shelf extending for the full width of their respective closure portions to strengthen them in a lateral direction, the first metal door having integral side wings for stiffening the closure portion of the first metal door in a vertical direction, the second metal door having integral side wings for stiffening the closure portion of the second metal door in the vertical direction, and the integral side wings of the second metal door being juxtaposed inside surfaces of the integral side wings of the first metal door so that the integral side wings extend for the full height of the closure portions of the first and second metal doors.

15. A dual door arrangement for generating an opening in a decorative panel for the deployment of an air bag that is covered by the decorative panel comprising;

a support that is adapted for securement between a deflated air bag and a decorative panel covering the deflated air bag and that has a generally rectangular frame, a first metal door that is attached to one side of the frame so that a closure portion swings from a closed position behind the decorative panel to an open position extending through the decorative panel, the first metal door having a outwardly projecting lip at an edge of its closure portion that is remote from the one side of the frame for initiating a central slit in the decorative panel for spreading the decorative panel apart to generate an opening in the decorative panel for deployment of the air bag as its closure portion swings from the closed position to the open position responsive to inflation of the air bag, a second metal door that is attached to an opposite side of the frame so that a closure portion swings from a closed position behind the decorative panel to an open position extending through the decorative panel, the second metal door having a depressed shelf at an end margin of its closure portion that is remote from the opposite side of the rectangular frame, the depressed shelf underlying an end margin of the closure portion of the first metal door that has the outward lip for assisting the lip in initiating the central slit for spreading the decorative panel apart during the initial stages of generating the opening in the decorative panel, and the support having ribs adjacent the short sides of the rectangular frame that extend outwardly for embedment in the decorative panel.

16. The dual door arrangement as defined in claim 6 wherein:

the first metal door has integral side wings for stiffening the closure portion of the first metal door in a vertical direction, the second metal door has integral side wings for stiffening the closure portion of the second metal door in the vertical direction, and the integral side wings of the second metal door are juxtaposed inside surfaces of the integral side wings of the first metal door so that the integral side wings extend for the full height of the closure portions of the first and second metal doors.

17. The dual door arrangement as defined in claim 11 wherein:

the first metal door has integral side wings for stiffening the closure portion of the first metal door in a vertical direction, the second metal door has integral side wings for stiffening the closure portion of the second metal door in the vertical direction, and the integral side wings of the second metal door are juxtaposed inside surfaces of the integral side wings of the first metal door so that the integral side wings extend for the full height of the closure portions of the first and second metal doors.

18. A dual door arrangement for providing an opening in a decorative panel for the deployment of an air bag that is covered by the decorative panel comprising;

a frame that is adapted for securement between a deflated air bag and a decorative panel covering the deflated air bag and that defines an opening for deployment of the air bag, a first door having a closure portion, a portion for attaching the first door to the frame, and a portion that acts as a hinge for swinging the closure portion from a closed position behind the decorative panel to an open position extending through the decorative panel, a second door having a closure portion, a portion for attaching the second door to the frame, and a portion that acts as a hinge for swinging the closure portion of the second door from a closed position behind the decorative panel to an open position extending through the decorative panel, the second door having integral side wings engagable with the frame for supporting the closure portion of the first door in the closed position, and the second door having an end margin underlying an end margin of the first door for supporting the closure portion of the first door in the closed position.

19. The dual door arrangement as defined in claim 18 wherein:

the first door has integral side wings engageable with the frame for supporting the closure portion of the first door in the closed position.

20. A dual door arrangement for providing an opening in a decorative panel for the deployment of an air bag that is covered by the decorative panel comprising;

a frame that is adapted for securement between a deflated air bag and a decorative panel covering the deflated air bag and that defines an opening for deployment of the air bag, a first door having a closure portion and means for attaching the first door to the frame for swinging the closure portion from a closed position behind the decorative panel to an open position extending through the decorative panel, a second door having a closure portion and means for attaching the second door to the frame for swinging the closure portion from a closed position behind the decorative panel to an open position extending through the decorative panel, the second door having portions bottoming out on the frame for supporting the closure portion of the second door in the closed position, and the second door having an end margin of its closure portion underlying an end margin of the closure portion of the first door for supporting the closure portion of the first door in the closed position.

21. The dual door arrangement as defined in claim 20 wherein:

the first door has portions bottoming out on the frame for supporting the closure portion of the first door in the closed position.

22. A dual door arrangement for providing an opening in a decorative panel for the deployment of an air bag that is covered by the decorative panel comprising;

a frame that is adapted for securement between a deflated air bag and a decorative panel covering the deflated air bag and that defines an opening for deployment of the air bag, a first door having a closure portion and means for attaching the first door to the frame for swinging the closure portion from a closed position behind the decorative panel to an open position extending through the decorative panel, the first door having means engagable with the frame for supporting the closure portion of the first door in the closed position, a second door having a closure portion and means for attaching the second door to the frame for swinging the closure portion from a closed position behind the decorative panel to an open position extending through the decorative panel, and the second door having means engagable with the frame for supporting the closure portion of the second door in the closed position.

23. A door arrangement for providing an opening in a decorative panel for the deployment of an air bag that is covered by the decorative panel comprising;

a frame that is adapted for securement between a deflated air bag and a decorative panel covering the deflated air bag and that defines a generally rectangular opening for deployment of the air bag, the frame having spaced sides opposite each other that project inwardly toward the deflated air bag, and a door having a closure portion and means for attaching the door to the frame for swinging the closure portion from a closed position behind the decorative panel to an open position extending through the decorative panel, and the door having integral side wings engagable with the spaced sides of the frame for supporting the closure portion of the door in the closed position.

24. A dual door arrangement for providing an opening in a decorative panel for the deployment of an air bag that is covered by the decorative panel comprising;

a frame that is adapted for securement between a deflated air bag and a decorative panel covering the deflated air bag and that defines an opening for deployment of the air bag, a first door having a closure portion and means for attaching the first door to the frame for swinging the closure portion from a closed position behind the decorative panel to an open position extending through the decorative panel, a second door having a closure portion and means for attaching the second door to the frame for swinging the closure portion of the second door from a closed position behind the decorative panel to an open position extending through the decorative panel, the first door having an outwardly projecting lip for initiating a central slit in the decorative panel for propagating an opening in the decorative panel for deployment of the air bag as its closure portion swings from the closed position to the open position responsive to inflation of the air bag, and the second door having an end margin of its closure portion underlying an end margin of the closure portion of the first door for helping the outwardly projecting lip in initiating the central slit.

* * * * *